Earl & Hunter.
Gate Latch.
Nº 104,287.   Patented Jun. 14, 1870.
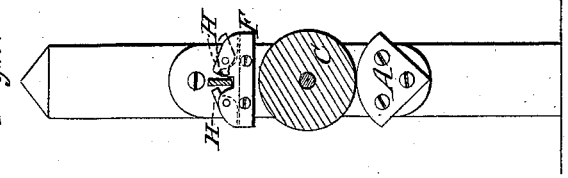
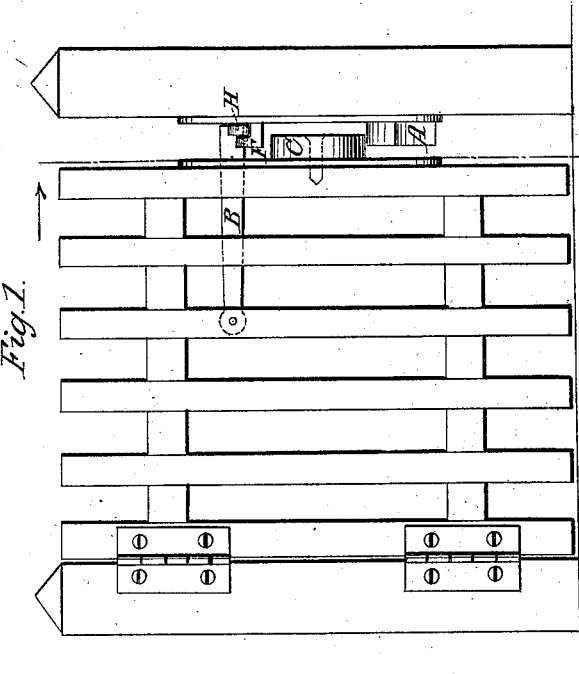
Witnesses.
O. Hinchman.
Geo. W. Mabee.
Inventor.
E. E. Earl.
J. B. Hunter
per Munn & Co.

United States Patent Office.

E. EDWARD EARLL, OF BROOKLYN, AND J. B. HUNTER, OF NEW YORK, N. Y.

Letters Patent No. 104,287, dated June 14, 1870.

IMPROVEMENT IN GATE-LATCHES.

The Schedule referred to in these Letters Patent and making part of the same.

*To all whom it may concern:*

Be it known that we, E. EDWARD EARLL, of Brooklyn, in the county of Kings and State of New York, and J. B. HUNTER, of the city, county, and State of New York, have invented a new and useful Improvement in Gate-Latch; and we do hereby declare that the following is a full, clear, and exact description thereof, which will enable others skilled in the art to make and use the same, reference being had to the accompanying drawing forming part of this specification.

This invention relates to improvements in self-locking apparatus for door, gate, and other similar latches, and designed also to prevent the sagging of the gates, doors, &c., and consists in arranging the roller and inclined ways at such a distance below the latching-device that the latter will prevent the gate being raised by cattle.

Figure 1 represents a front elevation of a gate-latch provided with my improvement.

Figure 2 represents a transverse vertical section of the same, taken on the line *x–x* of fig. 1.

Similar letters of reference indicate corresponding parts.

A represents a segment secured to the gate or door-post facing the gate or door and below the end of the latch.

C represents a button or wheel journaled upon a stud projecting from the gate in the vertical line of the latch.

A bracket, F, is fixed to the gate-post sufficiently above the segment A to permit the button or wheel C to pass between them when the gate is shut.

The said bracket projects over the upper surface of the button, and prevents the gate from being opened by raising up to throw the latch out of the notch, as is often done by pigs or other animals when the latch is arranged according to the common construction.

The catch for the latch B is in the top of this bracket F, which is provided at each side of the notch for the latch with weighted hinged dogs H, which are pressed down by the weight of the latch when moving into the notch, so that the end of the latch will be lower than the wall on the opposite side, to prevent the latch from jumping over the notch when the gate shuts quickly.

When the gate is being closed the wheel C engages with the segment A, and rolls up the curvature of the latter, thereby receiving the weight of that side of the gate, taking it off the hinges, and measurably preventing the gate from sagging.

Having thus described our invention,

What we claim as new, and desire to secure by Letters Patent, is—

The wheel C and segment A, when arranged directly below the latch, so that the wheel and latching device combine to prevent the gate from being raised and opened, as herein shown and described.

The above specification of our invention signed by us this 3d day of May, 1869.

E. EDWD. EARLL.
J. B. HUNTER.

Witnesses:
FRANK BLOCKLEY,
C. L. TOPLIFF.